United States Patent [19]
Arndt et al.

[11] Patent Number: 4,565,428
[45] Date of Patent: Jan. 21, 1986

[54] EYE SHIELD FOR A VIEWING DEVICE

[75] Inventors: Klaus Arndt, Zürich; Saverio Sanvido, Glattbrugg, both of Switzerland

[73] Assignee: Contraves AG, Zürich, Switzerland

[21] Appl. No.: 570,508

[22] Filed: Jan. 13, 1984

[30] Foreign Application Priority Data

Jan. 20, 1983 [CH] Switzerland ............................ 310/83

[51] Int. Cl.$^4$ ............................................. G02B 23/16
[52] U.S. Cl. ..................... 350/579; 350/321; 200/61.58 R; 200/DIG. 2
[58] Field of Search ............... 350/579, 538, 547, 321; 200/61.58 R, DIG. 2, 52 R; 351/244, 245

[56] References Cited

U.S. PATENT DOCUMENTS

| | | | |
|---|---|---|---|
| 2,647,438 | 8/1953 | Milne et al. | 350/579 |
| 2,852,975 | 9/1958 | Radde | 350/321 |
| 3,227,836 | 1/1966 | Renwick | 200/61.58 R |
| 3,290,985 | 12/1966 | Bains et al. | 350/321 |
| 3,669,523 | 6/1972 | Edwards | |
| 3,781,560 | 12/1973 | DeBurgh et al. | |
| 3,868,169 | 2/1975 | Pfenninger | |
| 4,045,630 | 8/1977 | McCarthy et al. | 200/DIG. 2 |

FOREIGN PATENT DOCUMENTS

| | | |
|---|---|---|
| 2632263 | 7/1976 | Fed. Rep. of Germany |
| 496246 | 9/1970 | Switzerland |

Primary Examiner—Jon W. Henry
Attorney, Agent, or Firm—Werner W. Kleeman

[57] ABSTRACT

An eye shield or eyepiece for a viewing device, especially for a day and night vision sighting device for aiming a weapon essentially comprises a headrest and first and second mounting frames. These components form an assembly for mounting on the housing of a viewing device. For the practical manipulation and adaptation of the headrest to the form of the head of the observer, two hinge-like articulations are provided in mutually spaced relationship on the external face of a forehead rest of the headrest. A relatively low pressure force against the inner face of the forehead rest deforms and correspondingly adapts the elastomeric or flexible plastic headrest. In order to actuate, for instance, a laser distance measuring device mounted in the viewing device, the assembly formed by the headrest and first and second mounting frame components is articulated to the housing of the viewing device, and an actuating or switching member mounted on the second mounting frame can be brought into engagement with an enabling switch.

5 Claims, 5 Drawing Figures

EYE SHIELD FOR A VIEWING DEVICE

BACKGROUND OF THE INVENTION

The present invention broadly relates to an eye shield or eyepiece for a viewing device having at least one ocular and, more specifically, pertains to a new and improved construction of an eye shield or eyepiece for a day and night vision sighting device for aiming a weapon. Such eye shield or eyepiece can be mounted on the housing of a viewing device and has a headrest or support body associated with the ocular.

An eye shield device is known from U.S. Pat. No. 2,852,975, granted Sept. 23, 1958, which comprises a headrest provided with a forehead rest portion and two lateral arm portions. The headrest of elastomeric plastic substantially surrounds two oculars of an optical system and is adaptable within a limited range to the form of the head of an observer due to its own or inherent flexibility.

A goggle-like design of night vision device is known from U.S. Pat. No. 3,781,560, granted Dec. 25, 1973, which comprises two light sources mounted in mutually spaced relationship on one side of a housing and having associated lens systems and two screen elements formed on the other side of the housing. The device is fixed to the head of a user by means of straps, and the face or side of the elastomeric plastic screen element confronting or adjacent to the head is adjustable within a limited range to the head form.

It is also known from the optical observation device of Swiss Pat. No. 496,246, granted Sept. 15, 1970, to provide a goggle-like eye shield device having forehead and chin rests mounted on it for determining the position of the head of an observer and the direction of view of an observer's eye in relation to the sight axis.

When designing such viewing or observation devices, especially when designing sighting devices for aiming a weapon, the adaptability of the headrest to the shape of the head of different observers must be take into consideration in order that every observer have a flawless view into the device protected against extraneous light.

SUMMARY OF THE INVENTION

Therefore, with the foregoing in mind it is a primary object of the present invention to provide a new and improved construction of an eye shield or eyepiece which does not have associated with it the aforementioned drawbacks and shortcomings of the prior art constructions.

Another and more specific object of the present invention aims at providing a new and improved construction of an eye shield of the previously mentioned type in which a relatively great adjustability of the headrest is obtained and correspondingly a flawless view for the observer with or without a protective mask and with or without a protective helmet.

Yet a further significant object of the present invention aims at providing a new and improved construction of an eye shield of the character described which is relatively simple in construction and design, extremely economical to manufacture, highly reliable in operation, and not readily subject to breakdown or malfunction.

Now in order to implement these and still further objects of the invention, which will become more readily apparent as the description proceeds, the eye shield of the present invention is manifested by the features that the headrest is provided with two hinge bodies or pivots mounted in mutually spaced relationship on the outer face or side of the headrest and so mounted on a first mounting frame having hinge journals that an articulated or hinge-like deformation of the headrest is obtained over and above its own flexural elasticity.

In a viewing device, especially in a day and night vision sighting device having a measuring device disposed in its housing, for instance a laser distance measuring device, a further embodiment provides an actuator or switching member which cooperates with an enabling switch to activate the measuring device.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
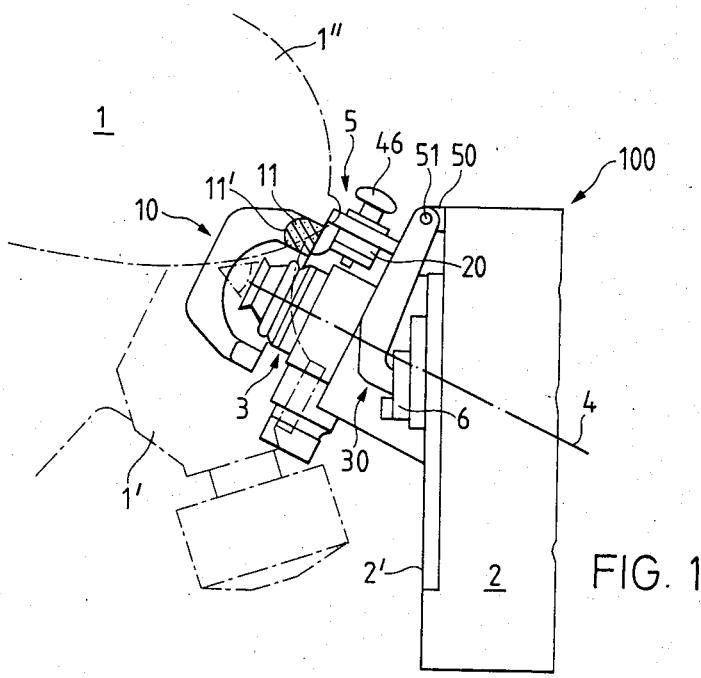
FIG. 1 is a schematic side view of an eye shield device mounted on a viewing device.

Describing now the drawings, it is to be understood that to simplify the showing of the drawings only enough of the construction of the eye shield device and related structure has been illustrated therein as is needed to enable one skilled in the art to readily understand the underlying principles and concepts of this invention. The illustrated exemplary embodiment of eye shield or eyepiece device depicted in FIG. 1 will be seen to comprise a headrest in an ocular system mounted on a partially shown housing 2 of a viewing device designated in its entirety by reference character 100. Viewing device 100 is, for instance, more specifically a day and night vision sighting device for aiming a suitable weapon not particularly shown in the drawings. An ocular 3 having an optical axis 4 and an eye shield device 5 for an observer 1 are disposed on the front side 2' of the housing 2.

The eye shield or eyepiece device 5 comprises a headrest or support body 10, a first mounting frame or holder body 20 for the headrest 10, a second mounting frame or holder body 30 for the components 10 and 20, and a mounting bracket or body 50 for the second mounting frame 30 and mounted on the housing 2 by any suitable means not particularly shown in the drawings. The components 10, 20 and 30 substantially form an assembly which is pivotally mounted on a pivot pin or bolt 51 retained in mounting bracket 50.

Figure 2:
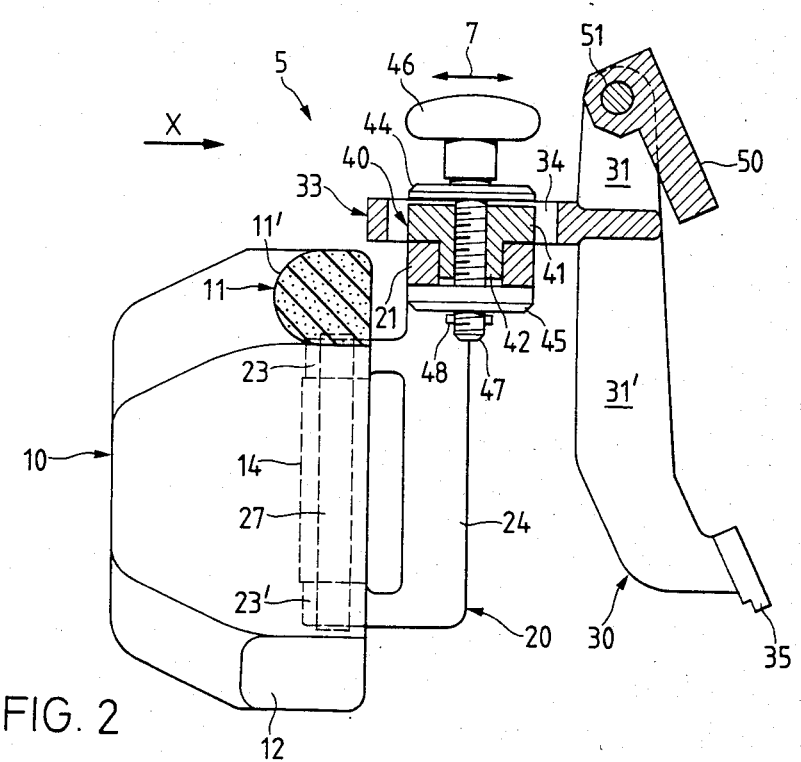
FIG. 2 is a schematic vertical section through the eye shield device of FIG. 1 on a larger scale.

The eye shield device 5 is shown in FIG. 2 in vertical section and in FIG. 3 in a frontal view looking in the direction of arrow X and will be described in detail in the following.

Figure 5:
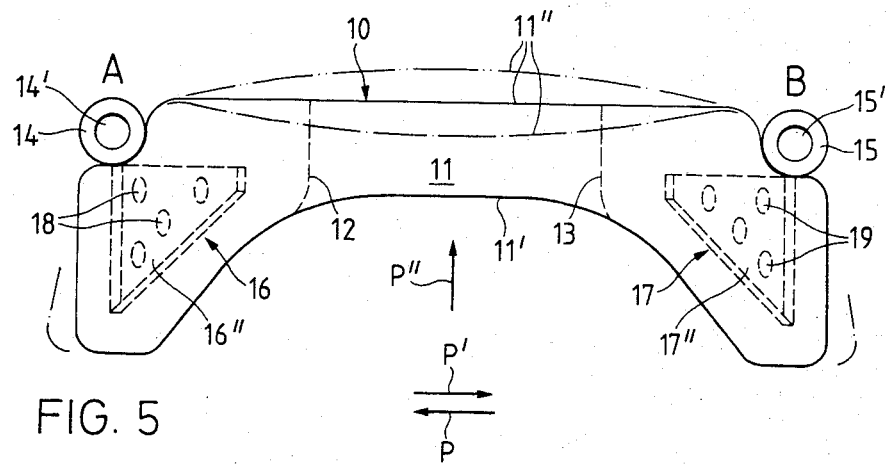
FIG. 5 is a schematic plan view of the headrest of the eye shield device depicted in FIGS. 1 to 4.

The headrest or support body 10 is cast of elastomeric foam plastic, preferably or polyurethane closed-cell foam and has a forehead rest 11 with two lateral arm portions or blinders 12 and 13 formed integrally on it. In FIG. 5 the headrest 10 is represented in plan view and the forehead rest 11 can be seen to have a shape at its inner face or side 11' substantially conforming to the forehead of a human head. It also has, as is shown in more detail in FIG. 3, the two substantially semi-circular lateral arm portions or blinders 12 and 13 formed integrally with it. Two hinge bodies or bushings 14, 15 structured to form hinge joints A, B are arranged in mutually spaced relationship on the outer face or side 11" of the forehead rest 11. Each hinge body 14, 15 is penetrated by a bore 14', 15' extending in the axial and vertical direction. Both hinge bodies or bushings 14, 15 are integrally molded with the headrest 10 and form with it a corresponding assembly.

Each of the hinge bodies 14, 15 is provided with a sheet metal structure 16, 17 angularly formed or bent and perforated with distributed apertures or holes 18, 19 to reinforce headrest 10. The sheet metal structures 16, 17 are appropriately fastened to the hinge bodies 14, 15 with any suitable means not particularly shown in the drawings. The sheet metal structures 16 and 17 having respectively the angularly structured or bent portions 16', 16" and 17', 17" disposed in the lateral arm portions 12 and 13 as well as in the forehead rest 11 can be seen in FIGS. 3 and 5. Both sheet metal structures 16, 17 are encased in the molded closed-cell foam. The perforation apertures 18, 19 provide homogenous communication of the molded closed-cell foam adhering to either side of the sheet metal structures 16, 17.

Figure 3:
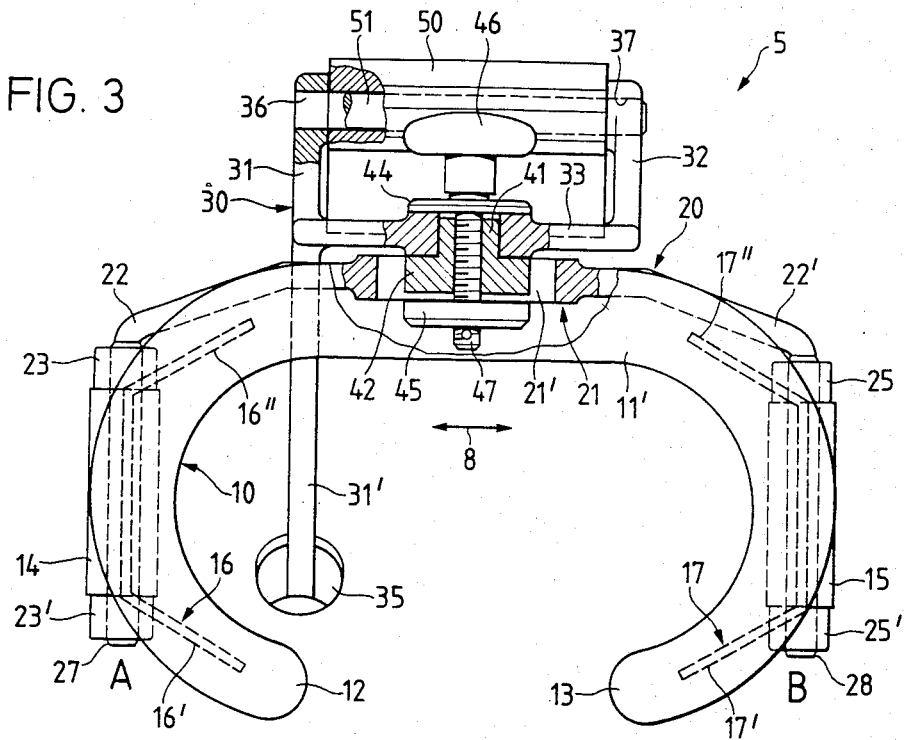
FIG. 3 is a schematic frontal view of the eye shield device of FIG. 2 taken in the direction of arrow X thereof.

According to FIG. 3, the lower regions of the semicircular lateral arm portions 12, 13 are disposed in mutual spaced relationship in order to provide an undisturbed view into the viewing device even when the observer 1 is wearing a protective mask 1' such as a gas mask.

The headrest 10 of elastic or flexible foam plastic is provided on both sides with the hinge bodies or bushings 14, 15 serving as the pivot or hinge joint locations A, B. This embodiment of the headrest 10 guarantees an adequate adaptation to different forms of the heads of observers with or without a protective helmet 1" and with or without a protective mask 1'. According to FIG. 5, the headrest 10 can be deformed and correspondingly adapted by a slight contact pressure of the observer 1 in the direction of the arrows P, P' or in the direction of the arrow P". A contact pressure in the direction of the arrows P, P' or P" effects approximately the deformation of headrest 10 that is represented in phantom line in FIG. 5.

The eye shield device 5 is shown on a larger scale in vertical section in FIG. 2. The headrest or support body 10, the first mounting frame or holder body 20 and the second mounting frame or holder body 30 are visible. The second mounting frame 30 comprises a cantilever component or bracket 33 structured to accommodate and fasten the first mounting frame 20. The first mounting frame 20 is releasably fastened to the bracket 33 by a correspondingly structured support element 21 and is horizontally adjustable. A clamping or adjusting screw 46, a first clamping washer or disk 44, a cruciform centering element 40, a threaded shaft 47 retained by pin 48 and a second clamping washer or disk 45 are visible.

The first mounting frame 20 is, as is shown in FIG. 2, jointly adjustable with headrest 10 in the direction of the double-headed arrow 7 and, as shown in FIG. 3, in the direction of the double-headed arrow 8 and in relation to the second mounting frame 30. It can be fixed in position by means of the clamping or adjusting screw 46. Portions 41 and 42 of the centering element 40 provide an accurately guided adjustment of the first mounting frame 20 in the direction of the double-headed arrows 7 and 8. The upper portion 41 of the centering element 40 is guided in an aperture or opening 34 of bracket 33 and the lower portion 42 is guided in an aperture or opening 21' of the first mounting frame 20.

Figure 4:
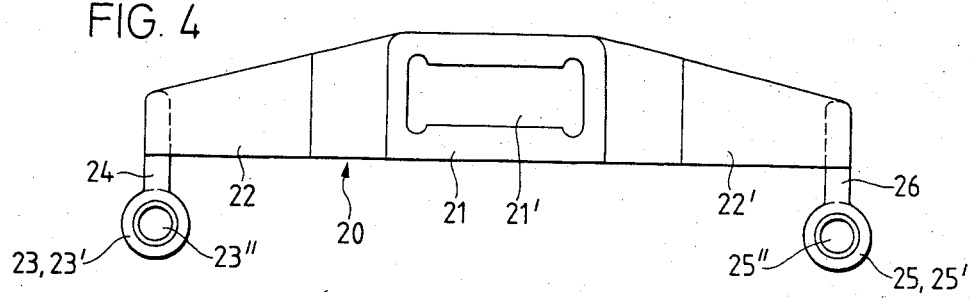
FIG. 4 is a schematic plan view of a mounting frame for the headrest of the eye shield device depicted in FIGS. 1 to 3.

The first mounting frame 20 shown in plan view in FIG. 4 comprises the support element 21 having the aperture 21', two laterally integral extensions 22, 22' and cantilever or support arms 24 and 26 formed on the extensions 22, 22'. Two hinge journals 23, 23' are mounted on the cantilever arm 24 in mutually spaced vertical relationship and two hinge journals 25, 25' are arranged on the cantilever arm 26 in mutually spaced vertical relationship. The hinge journals 23, 23' are each penetrated by a common bore 23" and the hinge journals 25, 25' by a common bore 25'.

The eye shield device 5 is shown in frontal view in FIG. 3 as seen in the direction of arrow X in FIG. 2. The headrest 10, the two extensions 22, 22' together with the hinge journals 23, 23' and 25, 25' of the first mounting frame 20 and the substantially fork-shaped second mounting frame 30 are visible. The headrest 10 is inserted at its two hinge bodies 14, 15 between the vertically spaced hinge journals 23, 23' and 25, 25' and is retained on one side by a pin 27 passing through the components 23, 14, 23' and on the other side by a pin 28 passing through the components 25, 15, 25'. Both pins 27, 28 are retained in position by any appropriate fixing means not particularly shown in the drawings.

The second mounting frame 30 comprises the cantilever component or bracket 33 with the aperture 34 and first and second arms 31, 32. These two arms 31, 32 are each penetrated in their upper regions by bores 36, 37 for accommodating a pin 51. Pin 51 serves to engage a bearing bracket 50 disposed between the two arms 31, 32. The pin 51 is likewise retained by any suitable fixing means not shown in the drawings. A further arm component 31' is integrally formed on the bracket 33 on the side of the first arm 31 and is provided with a crowned or plate-like actuator or actuating member 35 in its lower region and defining a switching element.

The actuator member or switching element 35 engages an enabling switch 6 illustrated in FIG. 1. Pressure exerted by the observer 1 against the inner face or side 11' of the headrest 10 actuates the enabling switch 6 through the actuator member 35. By this means a measuring device, preferably a laser distance measuring device, disposed in the housing 2 and not shown in the drawings, is activated.

While there are shown and described present preferred embodiments of the invention, it is to be distinctly understood that the invention is not limited thereto, but may be otherwise variously embodied and practiced within the scope of the following claims.

Accordingly, what we claim is:

1. An eye shield for a viewing device having at least one ocular, comprising:
   a flexural elastic headrest containing a forehead rest and two lateral portions;
   a first mounting frame for attachment of said flexural elastic headrest to a housing of said viewing device;

two hinge bodies mounted in mutually spaced relationship on an external side of said headrest;

said first mounting frame being provided with hinge journals cooperating with said two hinge bodies;

said headrest being hingedly mounted by means of said two hinge bodies at said hinge journals of said first mounting frame such that in addition to the inherent flexural elasticity of said headrest there is obtained a hinge-like deformation of said headrest;

a second mounting frame cooperating with said first mounting frame;

a mounting bracket for securing said headrest, said first mounting frame and said second mounting frame as a unit to the housing of the viewing device; and an actuator member arranged at said second mounting frame and displaceable into operable association with a switch of said viewing device by contact pressure exerted against said headrest by a user.

2. An eye shield for a viewing device having at least one ocular, comprising:

a flexural elastic headrest containing a forehead rest and two lateral portions;

a first mounting frame for attachment of said flexural elastic headrest to a housing of said viewing device;

two hinge bodies mounted in mutually spaced relationship on an external side of said headrest;

said first mounting frame being provided with hinge journals cooperating with said two hinge bodies;

said headrest being hingedly mounted by means of said two hinge bodies at said hinge journals of said first mounting frame such that in addition to the inherent flexural elasticity of said headrest there is obtained a hinge-like deformation of said headrest;

a second mounting frame for supporting said first mounting frame;

a mounting bracket structured to attach said second mounting frame to the housing of the viewing device;

an actuator member operatively connected with the second mounting frame;

an enabling switch for actuating a laser distance measuring device of said viewing device;

the headrest, the first mounting frame and the second mounting frame forming an assembly which is hingedly mounted to said viewing device; and said actuator member engaging said enabling switch to activate said laser distance measuring device when a pressure force is exerted upon it by a user.

3. An eye shield for a viewing device having at least one ocular which defines an axis of viewing, comprising:

a flexural elastic headrest containing a forehead rest and two lateral positions;

a first mounting frame for attachment of said flexural elastic headrest to a housing of said viewing device;

a first hinge body and a second hinge body mounted in mutually spaced relationship on an external side of said headrest;

said first hinge body defining a first hinge axis;

said second hinge body defining a second hinge axis;

said first hinge axis and said second hinge axis extending substantially parallel to one another in said mutually spaced relationship and in a plane extending transverse to the axis of viewing;

said first mounting frame being provided with a first hinge journal cooperating with said first hinge body;

said first mounting frame being provided with a second hinge journal cooperating with said second hinge body;

said headrest being hingedly mounted by means of said first and second hinge bodies in said first and second hinge journals of said first mounting frame such that said first hinge body is free to rotate about said first hinge axis and said second hinge body is free to rotate about said second hinge axis and thereby permit said headrest to deform in a direction substantially parallel to the axis of viewing for automatically adapting said headrest to the head of a viewer in response to a contact pressure of the head of the viewer;

a mounting bracket mounted on the housing of the viewing device;

a second mounting frame provided with two lateral arm portions in mutually spaced relationship and pivotably mounted in said mounting bracket;

said second mounting frame serving to support the headrest and said first mounting frame; and at least one of said lateral arm portions is provided with an extended arm portion terminated by a substantially plate-like actuator member.

4. The eye shield as defined in claim 3, wherein:

the headrest is made of elastomeric plastic;

sheet metal structures for reinforcing said lateral portions;

said sheet metal structures being fastened to said hinge bodies to reinforce the headrest; and the hinge bodies, the sheet metal structures and the plastic headrest forming an integral unit.

5. The eye shield as defined in claim 4, wherein:

the headrest is composed of polyurethane closed-cell foam.

* * * * *

UNITED STATES PATENT AND TRADEMARK OFFICE
CERTIFICATE OF CORRECTION

PATENT NO. : 4,565,428
DATED : January 21, 1986
INVENTOR(S) : KLAUS ARNDT et al

It is certified that error appears in the above—identified patent and that said Letters Patent is hereby corrected as shown below:

Column 1, line 40, please delete "take" and insert --taken--

Column 3, line 2, delete "or" and please insert --of--

Column 4, line 23, please delete "25'" (in the second occurance) and insert --25''--

Signed and Sealed this

Fifteenth Day of April 1986

[SEAL]

Attest:

DONALD J. QUIGG

Attesting Officer

Commissioner of Patents and Trademarks